United States Patent
Alidedeoglu et al.

(10) Patent No.: US 12,442,084 B2
(45) Date of Patent: Oct. 14, 2025

(54) METAL-CLAD POLYMER FILMS AND ELECTRONIC DEVICES

(71) Applicants: DUPONT ELECTRONICS, INC., Wilmington, DE (US); ROHM AND HAAS ELECTRONIC MATERIALS LLC, Marlborough, MA (US)

(72) Inventors: Husnu Alp Alidedeoglu, New Albany, OH (US); Patricia Gumbley, Marlborough, MA (US); Cecilia Hall, Marlborough, MA (US); Joseph Casey Johnson, Pickerington, OH (US); Benjamin Naab, Marlborough, MA (US); Jaclyn Murphy, Marlborough, MA (US); Grzegorz Slawinski, Fairborn, OH (US); Christopher Dennis Simone, Pickerington, OH (US); Catherine R Mulzer, Marlborough, MA (US)

(73) Assignees: DUPONT ELECTRONICS, INC., DE (US); ROHM AND HAAS ELECTRONIC MATERIALS LLC

( * ) Notice: Subject to any disclaimer, the term of this patent is extended or adjusted under 35 U.S.C. 154(b) by 906 days.

(21) Appl. No.: 16/840,280

(22) Filed: Apr. 3, 2020

(65) Prior Publication Data
US 2021/0310126 A1  Oct. 7, 2021

(51) Int. Cl.
| | |
|---|---|
| *B32B 27/28* | (2006.01) |
| *C08G 73/10* | (2006.01) |
| *C23C 18/16* | (2006.01) |
| *C23C 18/38* | (2006.01) |
| *C25D 3/38* | (2006.01) |
| *C25D 5/56* | (2006.01) |
| *H05K 9/00* | (2006.01) |

(52) U.S. Cl.
CPC ........ *C23C 18/1653* (2013.01); *B32B 27/281* (2013.01); *C08G 73/1067* (2013.01); *C23C 18/1641* (2013.01); *C23C 18/38* (2013.01); *C25D 3/38* (2013.01); *C25D 5/56* (2013.01); *H05K 9/0081* (2013.01); *B32B 2255/205* (2013.01); *Y10T 428/24* (2015.01); *Y10T 428/2495* (2015.01)

(58) Field of Classification Search
CPC ............. B32B 27/281; B32B 2255/205; Y10T 428/24; Y10T 428/2495
See application file for complete search history.

(56) References Cited

U.S. PATENT DOCUMENTS

| | | | |
|---|---|---|---|
| 5,166,308 A | 11/1992 | Kreuz et al. | |
| 5,298,331 A | 3/1994 | Kanakarajan et al. | |
| 10,021,789 B2 | 7/2018 | Ochi et al. | |
| 2005/0100719 A1* | 5/2005 | Kanakarajan | B32B 15/08 428/209 |
| 2006/0115670 A1* | 6/2006 | Tanaka | B32B 15/20 428/615 |
| 2010/0190029 A1 | 7/2010 | Ueki | |

* cited by examiner

*Primary Examiner* — Frank J Vineis
*Assistant Examiner* — Donald M Flores, Jr.

(57) ABSTRACT

In a first aspect, a metal-clad polymer film includes a polymer film adhered to a first metal layer. The root-mean-square roughness ($S_q$) of the interface between the polymer film and the first metal layer is less than 1 μm. The peel strength between the polymer film and the first metal layer is greater than 5 N/cm after 168 hours of aging at 150° C. when tested for a polymer film having a thickness in the range of from 25 to 75 μm and a first metal layer having a thickness of 18 μm in accordance with IPC-TM-650 test methods. The thickness of the first metal layer is 12 μm or less. The polymer film includes a first thermoplastic polyimide layer. In a second aspect, an electronic device includes the metal-clad polymer film of the first aspect. In a third aspect a process includes for forming a double-sided metal-clad polymer film.

14 Claims, No Drawings

METAL-CLAD POLYMER FILMS AND ELECTRONIC DEVICES

FIELD OF DISCLOSURE

The field of this disclosure is metal-clad polymer films and electronic devices, and processes for forming the same.

BACKGROUND OF THE DISCLOSURE

Metal-clad laminates, such as copper-clad laminates, are used in electronic devices for a variety of electronic components for flexible circuits, as well as for circuit packaging. Copper-clad laminates based on polyimide films are typically prepared by either lamination for metal thicknesses of greater than 5 µm or sputtering for metal thicknesses of less than 5 µm. Plating is an alternative method to produce laminates that has received some attention, but it is not widely used to produce laminates with less than 5 µm copper thickness. It is generally accepted that the reliability of plated polyimide copper laminates is below customer standards for electronic devices.

Metal-clad laminates produced by plating have traditionally had poor thermal reliability relative to metal clad produced by sputtering or lamination of copper foils. The highest reliability plated laminates have used electroless nickel seed layers. Use of electroless copper as a seed, which would improve the signal loss, usually results in a lower peel strength and greater changes in the peel strength with aging. Adhesion between plated copper and polyimide films is challenging because of the presence of volatiles in the film, the degradation of the film surface by plating chemistry, and the use of film materials that lack functionality for strong chemical bonding to copper among other factors.

Additionally, during the operation of electronic devices, electric and magnetic fields are generated by the electronic components in the device, which can interfere with the operation of other electronic components in the same device or other nearby devices. This phenomenon is termed Electro-Magnetic Interference (EMI). Metals are commonly used for EMI shielding due to their high electrical conductivity which enables them to absorb EMI waves. The degree of shielding effectiveness is not a constant for each shielding material but is affected by the frequency of the incoming signal. The shielding effectiveness is determined by: a) the electrical conductivity of the shield; b) the thickness, uniformity, and smoothness of the shield; c) the physical properties of the shield; d) the frequency and impedance of the impinging field; and e) the magnetic permeability of the material. A need also exists for thin coverlays which include a thin metal layer for EMI shielding of electronic components.

SUMMARY

In a first aspect, a metal-clad polymer film includes a polymer film adhered to a first metal layer. The root-mean-square roughness ($S_q$) of the interface between the polymer film and the first metal layer is less than 1 µm. The peel strength between the polymer film and the first metal layer is greater than 5 N/cm after 168 hours of aging at 150° C. when tested for a polymer film having a thickness in the range of from 25 to 75 µm and a first metal layer having a thickness of 18 µm in accordance with IPC-TM-650 test methods. The thickness of the first metal layer is 12 µm or less. The polymer film includes a first thermoplastic polyimide layer. The first thermoplastic polyimide layer is derived from at least three monomers including:
- a first dianhydride having ether functionality;
- 70 to 99.9 mol % of a first diamine selected from 1,3-bis(4-aminophenoxy)benzene and 1,3-bis(3-aminophenoxy)benzene; and
- 0.1 to 30 mol % of a second diamine having hydrogen bonding.

In a second aspect, an electronic device includes the metal-clad polymer film of the first aspect.

In a third aspect a process for forming a double-sided metal-clad polymer film includes:
- forming a first single-sided metal clad polymer film by forming a first multilayer polyimide film including a first thermoset layer adhered to a first thermoplastic layer and a second thermoplastic layer adhered to the first thermoset layer on a side opposite the first thermoplastic layer, wherein the first thermoplastic layer is derived from at least three monomers including:
  - a first dianhydride having ether functionality;
  - 70 to 99.9 mol % of a first diamine selected from 1,3-bis(4-aminophenoxy)benzene and 1,3-bis(3-aminophenoxy)benzene; and
  - 0.1 to 30 mol % of a second diamine having hydrogen bonding;
- forming a first metal layer on the first thermoplastic layer by electroless plating followed by electrolytic plating;
- forming a second single-sided metal clad polymer film by forming a second multilayer polyimide film including a second thermoset layer adhered to a third thermoplastic layer, wherein the third thermoplastic layer is derived from at least three monomers including:
  - a first dianhydride having ether functionality;
  - 70 to 99.9 mol % of a first diamine selected from 1,3-bis(4-aminophenoxy)benzene and 1,3-bis(3-aminophenoxy)benzene; and
  - 0.1 to 30 mol % of a second diamine having hydrogen bonding;
- forming a second metal layer on the third thermoplastic layer by electroless plating followed by electrolytic plating; and
- adhering the first single-sided metal clad polymer film to the second single-sided metal clad polymer film such that the second thermoplastic layer is in contact with the second thermoset layer.

The foregoing general description and the following detailed description are exemplary and explanatory only and are not restrictive of the invention, as defined in the appended claims.

DETAILED DESCRIPTION

In a first aspect, a metal-clad polymer film includes a polymer film adhered to a first metal layer. The root-mean-square roughness ($S_q$) of the interface between the polymer film and the first metal layer is less than 1 µm. The peel strength between the polymer film and the first metal layer is greater than 5 N/cm after 168 hours of aging at 150° C. when tested for a polymer film having a thickness in the range of from 25 to 75 µm and a first metal layer having a thickness of 18 µm in accordance with IPC-TM-650 test methods. The thickness of the first metal layer is 12 µm or less. The polymer film includes a first thermoplastic polyimide layer. The first thermoplastic polyimide layer is derived from at least three monomers including:

a first dianhydride having ether functionality;

70 to 99.9 mol % of a first diamine selected from 1,3-bis(4-aminophenoxy)benzene and 1,3-bis(3-aminophenoxy)benzene; and 0.1 to 30 mol % of a second diamine having hydrogen bonding.

In one embodiment of the first aspect, the first dianhydride is selected from the group consisting of 4,4'-oxydiphthalic anhydride (ODPA), 3,3',4,4'-biphenyl tetracarboxylic dianhydride (BPDA), 2,3',3,4'-biphenyl tetracarboxylic dianhydride (a-BPDA), 2,2',3,3'-biphenyl tetracarboxylic dianhydride (i-BPDA), 4,4'-(3,4-dicarboxyphenoxy)diphenylsulfide dianhydride, 1,4-bis(3,4-dicarboxyphenoxy)benzene dianhydride (HQDA), 1,3-bis(2,3-dicarboxyphenoxy)benzene dianhydride, 2,2',3,3'-oxydiphthalic anhydride, 4,4'-bis(3,4-dicarboxyl-phenoxy)benzidine dianhydride and 4,4'-bis(3,4-dicarboxyl-phenoxyphenyl)ether dianhydride.

In another embodiment of the first aspect, the first thermoplastic polyimide layer includes 50 to 99.9 mol % of the first dianhydride and further includes 0.01 to 50 mol % of a second dianhydride having ketone functionality. In a specific embodiment, the second dianhydride is selected from the group consisting of 3,3',4,4'-benzophenone tetracarboxylic dianhydride (BTDA) and 2,3',3,4'-benzophenone tetracarboxylic dianhydride.

In still another embodiment of the first aspect, the second diamine is selected from the group consisting of 4,4'-diaminobenzanilide (DABA), 2-(4-aminophenyl)-5-aminobenzimidazole (DAPBI), 2-(3-aminophenyl)-5-aminobenzimidazole, and 2,6-bis(5-aminophenoxy)pyridine.

In yet another embodiment of the first aspect, the metal-clad polymer film further includes a second metal layer adhered to the polymer film on a side opposite the first metal layer.

In still yet another embodiment of the first aspect, the polymer film further includes a first thermoset polyimide layer in contact with the first thermoplastic polyimide layer on a side opposite the first metal layer. In a specific embodiment, the polymer film further includes a second thermoplastic polyimide layer in contact with the first thermoset polyimide layer on a side opposite the first thermoplastic polyimide layer. In a more specific embodiment, the metal-clad polymer film further includes a second metal layer in contact with the second thermoplastic polyimide layer of the polymer film. In another more specific embodiment, the polymer film further includes a second thermoset polyimide layer in contact with the second thermoplastic polyimide layer on a side opposite the first thermoset polyimide layer, a third thermoplastic polyimide layer in contact with the second thermoset polyimide layer on a side opposite the second thermoplastic polyimide layer and a second metal layer in contact with the third thermoplastic polyimide layer on a side opposite the second thermoset polyimide layer. In a still more specific embodiment, the root-mean-square roughness ($S_q$) of the interface between the polymer film and the second metal layer is less than 1 μm. The peel strength between the polymer film and the second metal layer is greater than 5 N/cm after 168 hours of aging at 150° C. when tested for a polymer film having a thickness of in the range of from 25 to 75 μm and a first metal layer having a thickness of 18 μm, in accordance with IPC-TM-650 test methods. The thickness of the second metal layer is less than 12 μm. The third thermoplastic polyimide layer is derived from at least three monomers including:

a first dianhydride having ether functionality;

70 to 99.9 mol % of a first diamine selected from 1,3-bis(4-aminophenoxy)benzene and 1,3-bis(3-aminophenoxy)benzene; and 0.1 to 30 mol % of a second diamine having hydrogen bonding. In another still more specific embodiment, the polymer film further includes a fourth thermoplastic polyimide layer in between the second thermoplastic polyimide layer and the second thermoset polyimide layer.

In a second aspect, an electronic device includes the metal-clad polymer film of the first aspect.

In a third aspect a process for forming a double-sided metal-clad polymer film includes:

forming a first single-sided metal clad polymer film by forming a first multilayer polyimide film including a first thermoset layer adhered to a first thermoplastic layer and a second thermoplastic layer adhered to the first thermoset layer on a side opposite the first thermoplastic layer, wherein the first thermoplastic layer is derived from at least three monomers including:

a first dianhydride having ether functionality;

70 to 99.9 mol % of a first diamine selected from 1,3-bis(4-aminophenoxy)benzene and 1,3-bis(3-aminophenoxy)benzene; and 0.1 to 30 mol % of a second diamine having hydrogen bonding;

forming a first metal layer on the first thermoplastic layer by electroless plating followed by electrolytic plating;

forming a second single-sided metal clad polymer film by forming a second multilayer polyimide film including a second thermoset layer adhered to a third thermoplastic layer, wherein the third thermoplastic layer is derived from at least three monomers including:

a first dianhydride having ether functionality;

70 to 99.9 mol % of a first diamine selected from 1,3-bis(4-aminophenoxy)benzene and 1,3-bis(3-aminophenoxy)benzene; and 0.1 to 30 mol % of a second diamine having hydrogen bonding;

forming a second metal layer on the third thermoplastic layer by electroless plating followed by electrolytic plating; and adhering the first single-sided metal clad polymer film to the second single-sided metal clad polymer film such that the second thermoplastic layer is in contact with the second thermoset layer.

In one embodiment of the third aspect, the process further includes forming a fourth thermoplastic layer adhered to the second thermoset layer on a side opposite the third thermoplastic layer before adhering the first single-sided metal clad polymer film to the second single-sided metal clad polymer film, such that when the first and second single-sided metal clad polymer film are adhered to each other the second thermoplastic layer is in contact with the fourth thermoplastic layer.

In another embodiment of the third aspect, the first metal layer, the second metal layer, or both the first and second metal layers have a thickness of 12 μm or less. In a specific embodiment, the thickness is 8 μm or less.

In another embodiment of the third aspect, before electrolytic plating, one or both of the first and second single-sided metal clad polymer films are cured in a low humidity environment with a relative humidity of less than 20% for at least 12 hours. In a specific embodiment, one or both of the first and second single-sided metal clad polymer film are stored in the low humidity environment for at least 24 hours.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide manufacturing processes may be used to prepare polymer films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Solvents of the present invention may be used alone or in combination with other solvents (i.e., cosolvents). Useful organic solvents include: N-methylpyrrolidone (NMP), dimethylacetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis[2-(2-methoxyethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethylacetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, any number of suitable diamines can be used for polyimide layers in a polymer film. Some monomers may be preferred for thermoset polyimide layers, while others may be preferred in thermoplastic polyimide layers. As used herein when describing polyimides, the term "thermoplastic" is intended to describe a polyimide which, when heated above room temperature, will reach its softening temperature before decomposing, and the term "thermoset" is intended to describe a polyimide which, when heated above room temperature, will decompose before reaching its softening temperature. Thus, "thermoset polyimides" are not necessarily crosslinked as in the traditional definition of thermoset polymers.

In one embodiment, a suitable diamine for forming a polyimide layer can include an aliphatic diamine, such as 1,2-diaminoethane, 1,6-diaminohexane, 1,4-diaminobutane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, isophoronediamine, bicyclo[2.2.2]octane-1,4-diamine and combinations thereof. Other aliphatic diamines suitable for practicing the invention include those having six to twelve carbon atoms or a combination of longer chain and shorter chain diamines so long as both developability and flexibility are maintained. Long chain aliphatic diamines increase flexibility.

In one embodiment, a suitable diamine for forming a polyimide layer can further include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9,9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-tri-fluoromethyldiphenyloxide, 2,2-bis[4'(4"-aminophenoxy)phenyl]phthalein-3',5'-bis(trifluoromethyl)anilide (6FADAP) and 3,3',5,5'-tetrafluoro-4,4'-diamino-diphenylmethane (TFDAM).

In one embodiment, any number of diamines can be used in forming a polyimide layer, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-diaminobenzene.

In one embodiment, a thermoplastic polyimide layer of a polymer film can include a first diamine selected from 1,3-bis(4-aminophenoxy)benzene (RODA) and 1,3-bis(3-aminophenoxy)benzene and a second diamine having hydrogen bonding, such as 4,4'-diaminobenzanilide (DABA), 2-(4-aminophenyl)-5-aminobenzimidazole (DAPBI), 2-(3-aminophenyl)-5-aminobenzimidazole, or 2,6-bis(5-aminophenoxy)pyridine.

Dianhydrides

In one embodiment, any number of suitable dianhydrides can be used in forming polyimide layers in a polymer film. Some monomers may be preferred for thermoset polyimide layers, while others may be preferred in thermoplastic polyimide layers. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

In one embodiment, a suitable dianhydride can include an alicyclic dianhydride, such as cyclobutane dianhydride (CBDA), cyclohexane dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic acid 1,4:2,3-dianhydride (TCA) and meso-butane-1,2,3,4-tetracarboxylic acid dianhydride.

In one embodiment, a suitable dianhydride can include a fluorinated dianhydride, such as 4,4'-(hexafluoroisopropylidene)diphthalic anhydride (6FDA) and 9,9-bis (trifuoromethyl)-2,3,6,7-xanthene tetracarboxylic dianhydride.

In one embodiment, a thermoplastic polyimide layer of a polymer film can include a first dianhydride having ether functionality, such as 4,4'-oxydiphthalic anhydride (ODPA), 3,3',4,4'-biphenyl tetracarboxylic dianhydride (BPDA), 2,3', 3,4'-biphenyl tetracarboxylic dianhydride (a-BPDA), 2,2',3, 3'-biphenyl tetracarboxylic dianhydride (i-BPDA), 4,4'-(3, 4-dicarboxyphenoxy)diphenylsulfide dianhydride, 1,4-bis (3,4-dicarboxyphenoxy)benzene dianhydride (HQDA), 1,3-bis(2,3-dicarboxyphenoxy)benzene dianhydride, 2,2',3,3'-oxydiphthalic anhydride, 4,4'-bis(3,4-dicarboxyl-phenoxy) benzidine dianhydride and 4,4'-bis(3,4-dicarboxylphenoxyphenyl)ether dianhydride. In one embodiment, a thermoplastic polyimide layer of a polymer film can include a second dianhydride having ketone functionality, such as 3,3',4,4'-benzophenone tetracarboxylic dianhydride (BTDA) and 2,3',3,4'-benzophenone tetracarboxylic dianhydride.

Polymer Films

In one embodiment, a polyimide for a polymer film can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

In one embodiment, a polyamic acid casting solution is derived from the polyamic acid solution. The polyamic acid casting solution preferably comprises the polyamic acid solution can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Submicron particles, dispersed or suspended in solvent as described above, are then added to the polyamic acid solution.

In one embodiment, the polyamic acid solution, and/or the polyamic acid casting solution, is dissolved in an organic solvent at a concentration from about 5.0 or 10% to about 15, 20, 25, 30, 35 and 40% by weight.

The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents, provided that the loading levels and particle sizes do not overly impact the desirable properties of the film formed from the solution (e.g., the smoothness or adhesion of the polymer film). Inorganic fillers can include thermally conductive fillers, metal oxides, inorganic nitrides and metal carbides, and electrically conductive fillers like metals, graphitic carbon and carbon fibers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, graphite, multiwalled and single walled carbon nanotubes and carbon nanofibers.

The solvated mixture (the polyamic acid casting solution) can then be cast or applied onto a support, such as an endless belt or rotating drum, to give a film. In one embodiment, the polyamic acid can be solution cast in the presence of an imidization catalyst. Use of an imidization catalyst can help to lower the imidization temperature and shorten the imidization time. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Next, the solvent containing-film can be converted into a self-supporting film by heating at an appropriate temperature (thermal curing) together with conversion chemical reactants (chemical curing). The film can then be separated from the support, oriented such as by tentering, with continued thermal and chemical curing to provide a polyimide film.

Useful methods for producing polymer films containing a polyimide in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the conversion chemicals (catalysts) are mixed with the polyamic acid to form a polyamic acid casting solution and then cast to form a gel film.

(i) A method wherein the components are added in part or in whole in any order to either part or whole of the solvent, also where part or all of any component can be added as a solution in part or all of the solvent.

(j) A method of first reacting one of the dianhydride components with one of the diamine components giving a first polyamic acid. Then reacting another dianhydride component with another amine component to give a second polyamic acid. Then combining the amic acids in any one of a number of ways prior to film formation.

In one embodiment, if the polyimide is soluble, the polyimide can be formed in solution, optionally with the addition of catalysts at higher temperatures (>50° C.). After filtration, the polyimide powder can be re-dissolved in a solvent. The polyimide solution can then be cast onto a support (e.g. a moving belt or rigid support) and coalesced to create a polyimide film.

In a further embodiment, a polyamic acid precursor (to a polyimide film of the present invention) may be coated on a fully cured polyimide base film and subsequently imidized by heat treatment. The polyimide base film may be prepared by either a chemical or thermal conversion process and may be surface treated, e.g. by chemical etching, corona treatment, laser etching etc., to improve adhesion.

The thickness of the polymer film may be adjusted, depending on the intended purpose of the film or final application specifications. In one embodiment, the polymer film has a total thickness in a range of from about 1 to about 125 µm, or from about 2 to about 50 µm, or from about 4 to 20 about µm.

Metal-Clad Laminates

Metal-clad laminates can be formed as single-sided laminates or double-sided laminates by any number of well-known processes. In one embodiment, a metal plating process may be used to form a metal-clad laminate with a polymer film, such as a polyimide film. In one embodiment a polyimide film includes a thermoplastic polyimide layer. A metal layer can be formed on the thermoplastic polyimide layer of the polymer film by plating a thin metal layer. In one embodiment, a thin metal layer can be 18 µm or less, or 12 µm or less, or 8 µm or less or 5 µm or less. By using a plating process to form metal layers on polymer films, circuit elements with smoother interfaces can be formed. These smoother interfaces (low roughness) reduce electrical loss during high frequency transmission and enable finer circuit features. Conventional lamination of metal foils to polymer films rely on surface roughness of the foils to provide good adhesion to the polymer film, but also result in higher electrical losses during operation of the device.

In one embodiment, a polymer film includes a multilayer polyimide film that includes a thermoset layer and a thermoplastic layer. In one embodiment, a polyimide precursor for a first thermoset layer and a polyimide precursor for a first thermoplastic layer are cast simultaneously (using a multi-port die) to form a multilayer polyimide film (after curing of the polyamic acid layers). The first thermoplastic layer is derived from at least three monomers: (i) a first dianhydride having ether functionality, (ii) 70 to 99.9 mol % of a first diamine selected from 1,3-bis(4-aminophenoxy)benzene and 1,3-bis(3-aminophenoxy)benzene, and (iii) 0.1 to 30 mol % of a second diamine having hydrogen bonding. Polymer adhesion to a substrate is governed by three major mechanisms: 1) physical entanglement with the surface topology, 2) polymer-surface intermolecular interactions and 3) chemical bonding. The contribution of each mechanism to the overall adhesion can be controlled through the choice of monomer/polymer chemistry.

In one embodiment, physical entanglement and intermolecular interactions can be targeted for improved adhesion. For physical entanglement, the polymer chain flexibility can be controlled by incorporating monomers loosely classified as either stiff/rigid or flexible using a combination of conformational analysis and the Kier flexibility index. Stiff/rigid monomers are those found to have a small number of low energy conformations (<5) and a low Kier flexibility index, such as PMDA, PPD, TFMB and DABA. Flexible monomers are those found to have multiple (>5) low energy conformers and a high flexibility index, such as ODPA, BTDA and RODA. Polymer-surface intermolecular interactions can be estimated by calculating, at the generalized gradient approximation level within density functional theory, the complexation or binding energies of monomers or monomer fragments with the substrate. Strong charge transfer interactions can indicate effective binding strengths, thus aromatic monomers or monomers with carbonyl, ether and/or imine functionality or monomers with coordinating groups are well suited to provide adhesion via intermolecular interactions.

In one embodiment, the thermoplastic layer further includes a fourth monomer that is a second dianhydride having ketone functionality. In a specific embodiment, the thermoplastic layer includes 50 to 99.9 mol % of the first dianhydride and 0.01 to 50 mol % of the second dianhydride.

This multilayer film is then bonded to a first metal layer in a plating process using the first thermoplastic polyimide layer as the bonding layer to the first metal layer. A plating process can include electroless plating followed by electrolytic plating. The electroless plating process is used to form an initial metal layer of generally less than 250 nm, or enough to provide uniform conductivity across the surface.

The electrolytic plating process is then be used to build up the metal layer to the desired thickness, providing the preferred Cu grain structure for good conductivity. In one embodiment, the single-sided metal-clad laminate is cured in a low humidity environment with a relative humidity of less than 20% for at least 12 hours, or for at least 24 hours. In one embodiment, the surface of the multilayer polymer film to be plated can be plasma treated before the metal layer is formed. Thus, a metal-clad polymer film formed comprises the multilayer polyimide film and at least one thin, conductive layer, where the root-mean-square roughness ($S_q$) of the interface between the multilayer polyimide film and the first metal layer is less than 1 µm, or less than 0.5 µm, or less than 0.1 µm. Using a thermoplastic polyimide layer with the at least the three monomers described above enables strong adhesion between the polymer film and metal layer despite the smoothness of the interface between the layers, and without the use of additional primer or adhesive layers in between. In one embodiment, the peel strength between the multilayer polyimide film and the first metal layer is greater than 5 N/cm after 168 hours of aging at 150° C. for a multilayer polyimide film having a thickness in the range of from 25 to 75 µm and a first metal layer having a thickness of 18 µm or more, in accordance with IPC-TM-650 test methods. Those skilled in the art will appreciate that in order to measure the peel strength between the multilayer film and the first metal layer, the thickness of a thin metal layer needs to be increased to at least 18 µm in accordance with IPC-TM-650. This is conventionally done by electrolytic plating.

In one embodiment, a second thermoplastic layer is formed in contact with the first thermoset layer on a side opposite the first thermoplastic layer. A polyimide precursor for the thermoset layer and polyimide precursors for the first and second thermoplastic layers are cast simultaneously (using a multi-port die) to form a multilayer polyimide film (after curing of the polyamic acid layers). In one embodiment, a multilayer polyimide film can contain any number of thermoplastic and thermoset layers. This multilayer film is then bonded on one or both sides to metal layer(s) using the thermoplastic polyimide of the outer layer(s) as the bonding layer to the metal layer(s). At least one metal layer is bonded to the polymer film using a plating process to form a thin, first conductive layer. Thus, a multilayer film metal-clad laminate formed comprises the multilayer film and at least one thin, conductive layer. Likewise, a second metal layer can be bonded to the other side of the polymer film using a plating process to form a thin, second conductive layer. Alternatively, if a thicker second metal layer is desired, a conventional sputtering or lamination process may be used. Bonding of the multilayer polyimide/metal-clad laminates, when a metal foil is used as the second conductive layer, can take place in a double belt press in roll to roll processing, or in an autoclave in sheet to sheet processing.

In one embodiment, two single-sided, plated metal-clad polymer films can be combined to form a double-sided, metal-clad polymer film with thin metal layers on both sides. For instance, a single-sided metal-clad multilayer polyimide film with thermoplastic layers on either side of a thermoset layer can be combined with another single-sided metal-clad multilayer polyimide film (a thermoset layer with thermoplastic layer(s) on one or both sides) to form a double-sided metal-clad polymer film with thin metal layers on both sides. In another embodiment, a single-sided, plated metal-clad polymer film can be combined with another single-sided metal-clad polymer film (with a thicker metal layer) to form a double-sided metal-clad polymer film with a thin metal layer on one side. Those skilled in the art will appreciate that single-sided plated metal-clad polymer films can be used in a variety of combinations with other polymer and metal layers to build circuit structures that require at least one thin metal layer.

As used herein, the term "conductive layers" and "conductive foils" mean metal layers or metal foils (thin compositions having at least 50% of the electrical conductivity of a high-grade copper). Conductive foils are typically metal foils. Metal foils do not have to be used as elements in pure form; they may also be used as metal foil alloys, such as copper alloys containing nickel, chromium, iron, and other metals. The conductive layers may also be alloys of metals and are typically applied to the polyimides of the present invention via a sputtering step followed by an electro-plating step. In these types of processes, a metal seed coat layer is first sputtered onto a polyimide film. Finally, a thicker coating of metal is applied to the seed coat via electro-plating or electro-deposition. Such sputtered metal layers may also be hot pressed above the glass transition temperature of the polymer for enhanced peel strength.

In one embodiment, a metal-clad laminate can include the polymer film that is a multilayer polyimide film and a first metal layer adhered to an outer surface of the first outer layer of the multilayer film. In one embodiment, a metal-clad laminate can include a second metal layer adhered to an outer surface of the second outer layer of the multilayer film. In one embodiment, the first metal layer, the second metal layer or both metal layers can be copper. In one embodiment, a metal-clad laminate of the present invention comprising a double side copper-clad can be prepared by plating copper to one side and laminating copper foil to the other side of the multilayer polyimide film.

Applications

In one embodiment, metal-clad polymer films can be used in a variety of electronic devices where low-loss is required or advantageous. The emergence of applications using millimeter waves has been increasing and has encouraged the development of new low-loss dielectric materials that can enhance signal integrity and increase area of coverage in several key market segments. In the consumer electronics segment, the next generation of wireless networks, called "5G", will benefit from low-loss flexible dielectrics in antenna feedline and digital input/output circuit fabrication. In the military and aerospace segment, high data throughputs will be enhanced using low loss dielectrics for radar, antennas, unmanned air vehicle sensors, satellite communications, and real-time video transmission.

In one embodiment, the metal-clad polymer films of the present invention are useful for die pad bonding of flexible print connection boards or semiconductor devices or packaging materials for CSP (chip scale package), chip on flex (COF), COL (chip on lead), LOC (lead on chip), multi-chip module ("MCM"), ball grid array ("BGA" or micro-ball grid array), and/or tape automated bonding ("TAB").

In another embodiment, the metal-clad polymer films of the present invention may be used for wafer level integrated circuit packaging, where a composite is made using a polymer film according to the present invention interposed between a conductive layer (typically a metal) having a thickness of less than 100 µm, and a wafer comprising a plurality of integrated circuit dies. In one (wafer level integrated circuit packaging) embodiment, the conductive passageway is connected to the dies by a conductive passageway, such as a wire bond, a conductive metal, a solder bump or the like.

In another embodiment, the metal-clad polymer films of the present invention are used as a material to construct a planar transformer component. These planar transformer components are commonly used in power supply devices.

In another embodiment, the metal-clad polymer films of the present invention are used as a material to construct high density integrated circuitry (HDIC) including ultra-fine features, such as very tight pitches and very fine lines and spacings, which supports good signal integrity of high speed signal transmission at high frequency. Such circuitry is used for the construction of display module, touch sensor panel, sensors, and camera modules in mobile electronic devices.

In one embodiment, a coverlay, which provides EMI shielding for electronic devices and components, such as flexible circuit boards, antennas, and chip-on-flex, includes a metal-clad polymer film. To provide EMI shielding, the coverlay includes a uniform metal layer, that is highly conductive and strongly adherent to the base material, has a long-term retention of high electrical conductivity.

In yet another embodiment, the metal-clad polymer films of the present invention may be used with thick metal foils to form flexible heaters. These heaters are typically used in automotive and aerospace applications.

The advantageous properties of this invention can be observed by reference to the following examples that illustrate, but do not limit, the invention. All parts and percentages are by weight unless otherwise indicated.

EXAMPLES

Test Methods

Roughness

Root-mean-square roughness ($S_q$) was determined using a 3D Laser Scanning Confocal Microscope (VK-X260K, Keyence Corp., Itasca, Ill.). 10 unique locations were imaged with the 50× objective (287 um×216 um FOV). Images were corrected for tilt and curvature using second order polynomial fit. Representative height images, laser images, 3D images, line profiles, and surface roughness statistics were obtained for each sample.

Peel Strength

Peel strength was measured in accordance with IPC-TM-650 test methods on a tensile tester (Model 4464, Instron, Norwood, Mass.) using a 90° peel test fixture. Films were mounted on a rigid substrate with adhesive or double-sided tape. Peel strips were prepared with a strip width of 1 cm and length of 10 cm. Copper plating was performed to a final copper thickness of 18 µm. The peel test was performed by pulling the 1 cm strips at a rate of 50.8 mm/min. Data was collected over the longest length possible and the peel strength was reported as the average of the plateau region of the peel strips.

Thickness

Electroless thickness was measured with a x-ray fluorescence spectrometer (BA100, Bowman, Schaumburg, Ill.).

Total copper thickness was measured with a micrometer either by subtracting the known laminate thickness or by physical removal of the copper and measurement with a micrometer.

Example 1

For the polyamic acid (PAA) solution of Example 1 (E1), with a monomer composition of ODPA 0.95/BTDA 0.05// RODA 0.9/DABA 0.1, 17.64 g of 1,3-bis(4-aminophenoxy) benzene (RODA), 1.52 g of 4,4'-diaminobenzanilide (DABA), and 160 g of DMAc were charged to a dried 250 milliliter jacketed beaker equipped with mechanical stirrer. The mixture was heated using recirculating 45° C. glycol-water for several minutes until the diamine had completely dissolved resulting in a transparent solution. Next, 1.08 g of 3,3',4,4'-benzophenone tetracarboxylic dianhydride (BTDA) and 19.56 g of 4,4'-oxydiphthalic anhydride (ODPA) were added in alternated aliquots, incrementally with agitation, to the diamine solution contained within the reaction vessel. A total dianhydride:total diamine stoichiometric ratio of 0.99:1 was achieved. Stirring was continued until all of the solids dissolved and the reaction formed a PAA solution with a viscosity of 75-250 Poise. Polyamic solids were approximately 20%. The polymer solution was later decanted and stored at 0° C. until used for film casting.

The polyamic acid solution was later finished by incrementally adding, with mixing, a 6 wt % solution of pyromellitic dianhydride (PMDA) in DMAc, to achieve a final viscosity of 2500-3000 Poise. A polyimide film derived from the above PAA was thermally imidized. The finished polymer mixture was degassed. Using a stainless-steel casting rod, the polymer mixture was manually cast onto a glass plate. The wet film on the glass plate was then placed onto a hot plate and heated to about 80° C. or until the film became tack free. The dried film was then transferred onto a pin frame. While on the pin frame, the film was thermally converted to a polyimide using forced hot air for about half hour at each of the following temperatures 100° C., 150° C., 200° C., and 300° C. The film was removed from the pin frame for analysis and direct metallization.

The polyimide film was optionally treated with sequential plasma treatments:

| $1^{st}$ step: | $2^{nd}$ step: |
| --- | --- |
| RF power: 200 | RF power: 200 |
| Base Pressure: 250 | Base Pressure: 250 |
| Process Pressure: 300 | Process Pressure: 300 |
| Pressure range: 75 | Pressure range: 75 |
| $CF_4$: 20% | $O_2$: 100% |
| $O_2$: 80% | Time: 60 sec |
| Time: 300 sec | |

Films that were not plasma treated are noted below.

Electroless plating was performed by processing the films sequentially through the following treatments:

1. The films were immersed in 1M sodium hydroxide solution at 45° C. for 90 seconds with gentle agitation.
2. The films were then rinsed with flowing tap water for 120 seconds.
3. The films were immersed in CIRCUPOSIT™ 6520A Pre-Dip (DuPont de Nemours, Inc., Wilmington, Del.) at pH 2 at room temperature for 30 seconds with gentle agitation.
4. The films were then immersed in CIRCUPOSIT™ 6530 Catalyst (DuPont) made-up at 200 ppm $Pd^{2+}$ ion concentration at 42° C. for 60 seconds with gentle agitation.
5. The films were then rinsed with flowing tap water for 60 seconds.
6. The films were then immersed in an aqueous solution of 0.6 g/L dimethylamine borane and 5 g/L boric acid adjusted to a pH of 7 to 7.5 at 34° C. for 60 seconds with gentle agitation.

7. The films were then rinsed with flowing tap water for 60 seconds.
8. The films were then immersed in a CIRCUPOSIT™ P-6550 electroless copper plating bath at about 34° C. for 2.5 minutes.
9. After electroless plating the films were dried and baked in a vacuum oven at 80° C. and −25 mm Hg pressure for 1 hour.
10. The films were removed from the oven and stored in a desiccator until electrolytic copper plating could be performed.

The electroless plating process forms an approximately 80-120 nm layer of copper on the polyimide film. The electroless plating process is then followed by an electrolytic plating process, which was performed by processing the films sequentially through the following treatments:
1. The films were removed from the desiccator and pretreated with RONACLEAN™ LP-200 cleaner (DuPont) for 60 seconds at 40° C.
2. The films were then rinsed with flowing tap water for 60 seconds.
3. The films were then treated in sulfuric acid for 30 seconds before transferring to the electrolytic plating bath.
4. Films were plated at 20 ASF in a bright acid copper bath to a final thickness of 18 μm in order to prepare metal-clad laminates for peel strength testing.
5. Following electrolytic copper plating the films were rinsed with DI water, immersed in Anti-tarnish 7130 (DuPont), rinsed briefly with water, dried with air, and stored in a desiccator for at least 24 hours before peel strength measurement.

E1 has an initial peel strength of 6.7 N/cm and after 168 hr at 150° C., an aged peel strength of 5.8 N/cm. The roughness, $S_q$(air), of the interface between the polyimide film and the Cu metal layer was 0.033 μm. The data is shown in Table 1.

Comparative Example 1 and Examples 2 and 3

Comparative Example 1 (CE1) and Examples 2 and 3 (E2-E3) were prepared in the same manner of E1, but using slightly different monomer compositions. The compositions, peel strengths before and after aging, and the smoothness of the interfaces are shown in Table 1.

TABLE 1

| Example | ODPA | BTDA | RODA | DABA | Initial (N/cm) | 168 hr (N/cm) | $S_q$ (air) (μm) | $S_q$ (drum) (μm) |
|---------|------|------|------|------|---------|--------|---------|----------|
| E1 | 95 | 5 | 90 | 10 | 6.7 | 5.8 | 0.033 | 0.019 |
| CE1 | 95 | 5 | 70 | 30 | 8.2 | 4.7 | 0.007 | 0.014 |
| E2 | 90 | 10 | 90 | 10 | 6.4 | 6.2 | 0.013 | 0.005 |
| E3 | 90 | 10 | 70 | 30 | 8.0 | 5.5 | 0.002 | 0.030 |

Comparative Examples 2 to 7

Comparative Examples 2 to 7 (CE2-CE7) were prepared in the same manner of E1, but using 2,2-bis-(4-[4-aminophenoxy]phenyl) propane (BAPP) instead of RODA. The compositions, peel strengths before and after aging, and the smoothness of the interfaces are shown in Table 2. Due to intermolecular interactions, polyimide films containing RODA have higher binding energy with the smooth metal surface than films containing BAPP, resulting in better adhesion to the metal layer. CE2 benefits from the good binding energy of DABA.

TABLE 2

| Example | ODPA | BTDA | BAPP | DABA | Initial (N/cm) | 168 hr (N/cm) | $S_q$ (air) (μm) | $S_q$ (drum) (μm) |
|---------|------|------|------|------|---------|--------|---------|----------|
| CE2 | 100 | 0 | 70 | 30 | 5.5 | 5.4 | 0.012 | 0.010 |
| CE3 | 100 | 0 | 100 | 0 | 3.9 | 3.4 | 0.020 | <0.001 |
| CE4 | 95 | 5 | 100 | 0 | 4.3 | 3.9 | 0.009 | 0.012 |
| CE5 | 95 | 5 | 90 | 10 | 4.2 | 3.7 | 0.007 | 0.066 |
| CE6 | 90 | 10 | 90 | 10 | 5.3 | 4.3 | — | — |
| CE7 | 90 | 10 | 70 | 30 | 6.7 | 3.3 | — | — |

Examples 4 to 13

Examples 4 to 9 (E4-E9) were prepared in the same manner of E1, but using 2-(3-aminophenyl)-5-aminobenzimidazole (DAPBI) instead of DABA. E5, E9, E11 and E13 were not plasma treated prior to metallization. The compositions, peel strengths before and after aging, and the smoothness of the interfaces are shown in Table 3. The binding energies of DAPBI and DABA are similar and they both adhere well. The slightly higher adhesion for the DAPBI examples may be the result of chemical bonding with the metal layer.

TABLE 3

| Example | ODPA | BTDA | RODA | DAPBI | Initial (N/cm) | 168 hr (N/cm) | $S_q$ (air) (μm) | $S_q$ (drum) (μm) |
| --- | --- | --- | --- | --- | --- | --- | --- | --- |
| E4  | 95  | 5  | 90 | 10 | 8.3  | 6.1 | 0.006 | 0.039 |
| E5  | 95  | 5  | 90 | 10 | 0.6  | 6.3 | 0.006 | 0.039 |
| E6  | 95  | 5  | 70 | 30 | 6.5  | 5.8 | 0.011 | 0.005 |
| E7  | 90  | 10 | 90 | 10 | 10.3 | 7.2 | 0.012 | 0.015 |
| E8  | 90  | 10 | 70 | 30 | 11.6 | 7.7 | 0.028 | 0.019 |
| E9  | 90  | 10 | 70 | 30 | 1.7  | 6.3 | 0.028 | 0.019 |
| E10 | 100 | 0  | 90 | 10 | 6.3  | 5.4 | 0.003 | 0.006 |
| E11 | 100 | 0  | 90 | 10 | 1.3  | 7.3 | 0.003 | 0.006 |
| E12 | 100 | 0  | 70 | 30 | 9.2  | 5.8 | 0.012 | 0.004 |
| E13 | 100 | 0  | 70 | 30 | 1.4  | 7.0 | 0.012 | 0.004 |

Comparative Examples 8 to 15

Comparative Examples 8 to 15 (CE8-CE15) were prepared in the same manner of E1, but using BAPP instead of RODA and DAPBI instead of DABA. CE8, CE10 and CE13 were not plasma treated prior to metallization. The compositions, peel strengths before and after aging, and the smoothness of the interfaces are shown in Table 4. In these examples, the benefits of using DAPBI is not enough to overcome the lower binding energy of BAPP.

TABLE 4

| Example | ODPA | BTDA | BAPP | DAPBI | Initial (N/cm) | 168 hr (N/cm) | $S_q$ (air) (μm) | $S_q$ (drum) (μm) |
| --- | --- | --- | --- | --- | --- | --- | --- | --- |
| CE8  | 95  | 5  | 90  | 10 | 0.2 | 3.7 | 0.008 | 0.005 |
| CE9  | 95  | 5  | 70  | 30 | 3.9 | 4.5 | 0.009 | 0.011 |
| CE10 | 90  | 10 | 90  | 10 | 0.3 | 3.7 | 0.014 | 0.038 |
| CE11 | 90  | 10 | 70  | 30 | 5.5 | 4.0 | 0.033 | 0.013 |
| CE12 | 90  | 10 | 100 | 0  | 8.7 | 2.7 | 0.020 | 0.006 |
| CE13 | 100 | 0  | 90  | 10 | 0.2 | 3.7 | 0.005 | 0.015 |
| CE14 | 100 | 0  | 70  | 30 | 5.5 | 4.7 | 0.003 | 0.031 |
| CE15 | 100 | 0  | 100 | 0  | 6.7 | 1.2 | 0.006 | 0.017 |

Comparative Example 16 and Examples 14 and 15

Comparative Example 16 (CE16) and Examples 14 and 15 9 (E14-E15) were prepared in the same manner of E1, but using (DAPBI) instead of DABA. The compositions, peel strengths before and after aging, and the smoothness of the interfaces are shown in Table 5.

TABLE 5

| Example | ODPA | BTDA | RODA | DAPBI | Initial (N/cm) | 168 hr (N/cm) | $S_q$ (air) (μm) | $S_q$ (drum) (μm) |
| --- | --- | --- | --- | --- | --- | --- | --- | --- |
| CE16 | 80 | 20 | 70 | 30 | 4.6 | 4.7 | 0.008 | 0.011 |
| E14  | 70 | 30 | 70 | 30 | 6.8 | 6.5 | 0.011 | 0.004 |
| E15  | 50 | 50 | 70 | 30 | 6.2 | 7.3 | 0.010 | 0.018 |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A metal-clad polymer film comprising a polymer film adhered to a first metal layer, wherein:
the polymer film comprises a first thermoplastic polyimide layer, wherein the first thermoplastic polyimide layer is derived from at least three monomers comprising:
a first dianhydride having ether functionality;
70 to 99.9 mol % of a first diamine selected from 1,3-bis(4-aminophenoxy)benzene and 1,3-bis(3-aminophenoxy)benzene; and
0.1 to 30 mol % of a second diamine having hydrogen bonding;
the root-mean-square roughness ($S_q$) of the interface between the polymer film and the first metal layer is less than 0.1 μm;
the peel strength between the polymer film and the first metal layer is greater than 5 N/cm after 168 hours of aging at 150° C. when tested for a polymer film having a thickness in the range of from 25 to 75 μm and a first metal layer having a thickness of 18 μm in accordance with IPC-TM-650 test methods; and
the thickness of the first metal layer is 12 μm or less.

2. The metal-clad polymer film of claim 1, wherein the first dianhydride is selected from the group consisting of 4,4'-oxydiphthalic anhydride (ODPA), 3,3',4,4'-biphenyl tetracarboxylic dianhydride (BPDA), 2,3',3,4'-biphenyl tetracarboxylic dianhydride (a-BPDA), 2,2',3,3'-biphenyl tetracarboxylic dianhydride (i-BPDA), 4,4'-(3,4-dicarboxyphenoxy)diphenylsulfide dianhydride, 1,4-bis(3, 4-dicarboxyphenoxy)benzene dianhydride (HQDA), 1,3-bis(2,3-dicarboxyphenoxy)benzene dianhydride, 2,2', 3,3'-oxydiphthalic anhydride, 4,4'-bis(3,4-dicarboxyl-phenoxy) benzidine dianhydride and 4,4'-bis(3,4-dicarboxyl-phenoxyphenyl)ether dianhydride.

3. The metal-clad polymer film of claim 1, wherein the first thermoplastic polyimide layer comprises 50 to 99.9 mol % of the first dianhydride and further comprises 0.01 to 50 mol % of a second dianhydride having ketone functionality.

4. The metal-clad polymer film of claim 3, wherein the second dianhydride is selected from the group consisting of 3,3', 4,4'-benzophenone tetracarboxylic dianhydride (BTDA) and 2,3', 3,4'-benzophenone tetracarboxylic dianhydride.

5. The metal-clad polymer film of claim 1, wherein the second diamine is selected from the group consisting of 4,4'-diaminobenzanilide (DABA), 2-(4-aminophenyl)-5-aminobenzimidazole (DAPBI), 2-(3-aminophenyl)-5-aminobenzimidazole, and 2,6-bis(5-am inophenoxy)pyridine.

6. The metal-clad polymer film of claim 1 further comprising a second metal layer adhered to the polymer film on a side opposite the first metal layer.

7. The metal-clad polymer film of claim 1, wherein the polymer film further comprises a first thermoset polyimide layer in contact with the first thermoplastic polyimide layer on a side opposite the first metal layer.

8. The metal-clad polymer film of claim 7, wherein the polymer film further comprises a second thermoplastic polyimide layer in contact with the first thermoset polyimide layer on a side opposite the first thermoplastic polyimide layer.

9. The metal-clad polymer film of claim 8 further comprising a second metal layer in contact with the second thermoplastic polyimide layer of the polymer film.

10. The metal-clad polymer film of claim 8, wherein the polymer film further comprises:
a second thermoset polyimide layer in contact with the second thermoplastic polyimide layer on a side opposite the first thermoset polyimide layer;
a third thermoplastic polyimide layer in contact with the second thermoset polyimide layer on a side opposite the second thermoplastic polyimide layer; and
a second metal layer in contact with the third thermoplastic polyimide layer on a side opposite the second thermoset polyimide layer.

11. The metal-clad polymer film of claim 10, wherein:
the third thermoplastic polyimide layer is derived from at least three monomers comprising:
a second dianhydride having ether functionality;
70 to 99.9 mol % of a third diamine selected from 1,3-bis(4-aminophenoxy)benzene and 1,3-bis(3-aminophenoxy)benzene; and
0.1 to 30 mol % of a fourth diamine having hydrogen bonding;
the root-mean-square roughness ($S_q$) of the interface between the polymer film and the second metal layer is less than 1 μm;
the peel strength between the polymer film and the second metal layer is greater than 5 N/cm after 168 hours of aging at 150° C. when tested for a polymer film having a thickness of in the range of from 25 to 75 μm and a first metal layer having a thickness of 18 μm, in accordance with IPC-TM-650 test methods; and
the thickness of the second metal layer is less than 12 μm.

12. The metal-clad polymer film of claim 10, wherein the polymer film further comprises a fourth thermoplastic polyimide layer in between the second thermoplastic polyimide layer and the second thermoset polyimide layer.

13. An electronic device comprising the metal-clad polymer film of claim 1.

14. A metal-clad polymer film comprising a polymer film adhered to a first metal layer, wherein:
the polymer film comprises a first thermoplastic polyimide layer, wherein the first thermoplastic polyimide layer is derived from at least three monomers comprising:
a first dianhydride having ether functionality;
70 to 99.9 mol % of a first diamine selected from 1,3-bis(4-aminophenoxy)benzene and 1,3-bis(3-aminophenoxy)benzene; and
0.1 to 30 mol % of a second diamine having hydrogen bonding;
the root-mean-square roughness ($S_q$) of the interface between the polymer film and the first metal layer is less than 1 μm;
the peel strength between the polymer film and the first metal layer is greater than 5 N/cm after 168 hours of aging at 150° C. when tested for a polymer film having a thickness in the range of from 25 to 75 μm and a first metal layer having a thickness of 18 μm in accordance with IPC-TM-650 test methods;
the thickness of the first metal layer is 12 μm or less; and
the surface of the polymer film adhered to the first metal layer is not surface treated.

* * * * *